(12) United States Patent
Cho et al.

(10) Patent No.: US 8,542,644 B2
(45) Date of Patent: Sep. 24, 2013

(54) METHOD FOR REQUESTING UPLINK RESOURCES AND TRANSMITTING UPLINK DATA

(75) Inventors: Hee Jeong Cho, Anyang-si (KR); Ki Seon Ryu, Sungnam-si (KR)

(73) Assignee: LG Electronics Inc., Seoul (KR)

( * ) Notice: Subject to any disclaimer, the term of this patent is extended or adjusted under 35 U.S.C. 154(b) by 288 days.

(21) Appl. No.: 13/057,441

(22) PCT Filed: Aug. 27, 2009

(86) PCT No.: PCT/KR2009/004789
§ 371 (c)(1),
(2), (4) Date: Feb. 3, 2011

(87) PCT Pub. No.: WO2010/024607
PCT Pub. Date: Mar. 4, 2010

(65) Prior Publication Data
US 2011/0134873 A1 Jun. 9, 2011

Related U.S. Application Data

(60) Provisional application No. 61/092,750, filed on Aug. 29, 2008.

(30) Foreign Application Priority Data

Sep. 24, 2008 (KR) ........................ 10-2008-0093745

(51) Int. Cl.
*H04W 4/00* (2009.01)

(52) U.S. Cl.
USPC ............ 370/329; 370/431; 370/468; 455/450

(58) Field of Classification Search
None
See application file for complete search history.

(56) References Cited

U.S. PATENT DOCUMENTS

| | | | |
|---|---|---|---|
| 2005/0063330 A1* | 3/2005 | Lee et al. | 370/328 |
| 2006/0239241 A1* | 10/2006 | Eom et al. | 370/348 |
| 2007/0104221 A1 | 5/2007 | Venkatachalam et al. | |
| 2008/0159334 A1* | 7/2008 | Venkatachalam et al. | 370/479 |
| 2009/0109932 A1* | 4/2009 | Maheshwari et al. | 370/335 |
| 2010/0202420 A1* | 8/2010 | Jersenius et al. | 370/337 |

FOREIGN PATENT DOCUMENTS

EP 1940185 7/2008

* cited by examiner

*Primary Examiner* — Chi Pham
*Assistant Examiner* — Mohammad Adhami
(74) *Attorney, Agent, or Firm* — Lee, Hong, Degerman, Kany & Waimey (57) ABSTRACT

A method for requesting uplink resources and transmitting data is provided. The method includes being allocated to a BR code from a BS by an MS, and transmitting a BR indicator in a format without an ID of the MS to the BS using the BR code in non-contention mode by the MS. Because contention-based MSs and non-contention-based MSs transmit different uplink allocation request information, unnecessary information transmission is avoided, which is efficient. Also, information specific to each MS can be transmitted in extra resources.

11 Claims, 11 Drawing Sheets

| MS-ID | QoS level | CRC |

FIG. 4

| MS-ID | BR size | QoS level | CRC |

FIG. 5

| BR size | QoS level | CRC |

METHOD FOR REQUESTING UPLINK RESOURCES AND TRANSMITTING UPLINK DATA

CROSS-REFERENCE TO RELATED APPLICATIONS

This application is the National Stage filing under 35 U.S.C. 371 of International Application No. PCT/KR2009/004789, filed on Aug. 27, 2009, which claims the benefit of earlier filing date and right of priority to Korean Application No. 10-2008-0093745, filed on Sep. 24, 2008, and also claims the benefit of U.S. Provisional Application Ser. No. 61/092,750, filed on Aug. 29, 2008, the contents of all of which are incorporated by reference herein in their entirety.

TECHNICAL FIELD

The present invention relates to an UpLink (UL) allocation request in a broadband wireless access system, and more particularly, to a method for avoiding unnecessary information transmission, when a Mobile Station (MS) requests a bandwidth.

BACKGROUND ART

Figure 1:
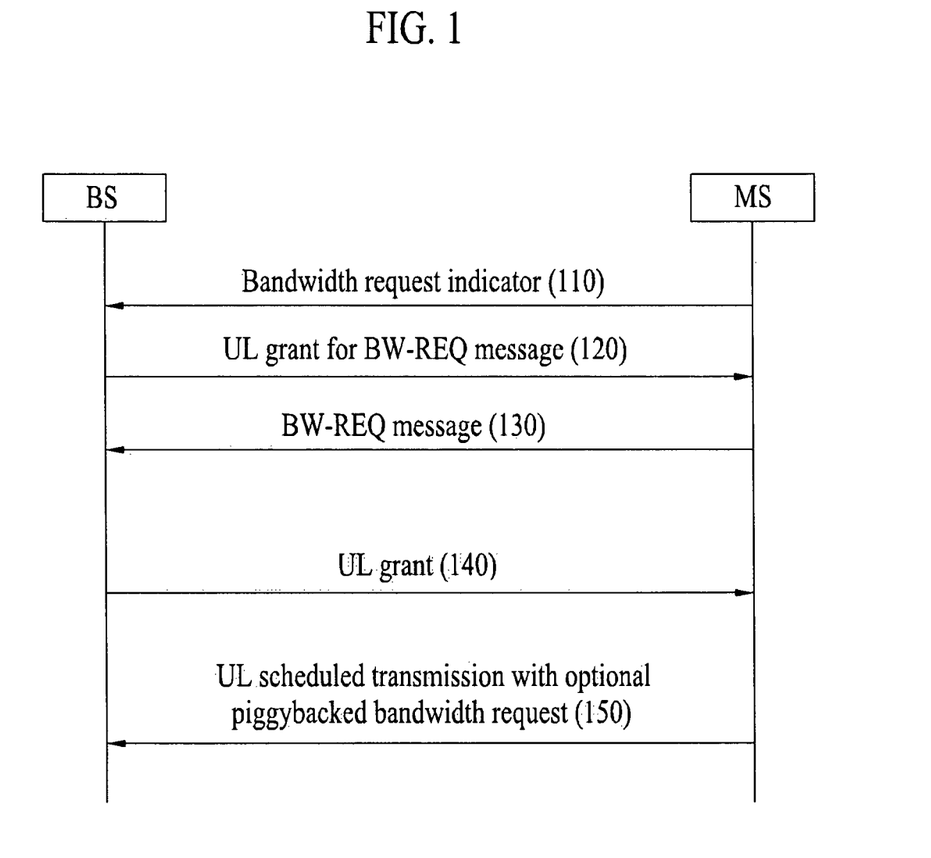
FIG. 1 is a diagram illustrating a signal flow for a random access-based UpLink (UL) Bandwidth Request (BR) procedure of an MS in a broadband wireless access system.

FIG. 1 is a diagram illustrating a signal flow for a random access-based uplink Bandwidth Request (BR) procedure of an MS in a broadband wireless access system.

Referring to FIG. 1, a Base Station (BS) supports both a 5-step regular access procedure (steps 110 to 150) and a 3-step quick access procedure (steps 110, 140 and 150). The 5-step regular access procedure may be used independently of the 3-step quick access procedure or a fallback for the 3-step quick access procedure.

In the 3-step quick access procedure, the MS transmits a BR indicator including an MS Identifier (ID), information about a requested bandwidth, etc. to the BS in step 110. Upon receipt of the BR indicator, the BS allocates UL resources to the MS in step 140. In step 150, the MS transmits data in the allocated UL resources. The MS may also transmit additional UL BR information.

In the 5-step regular access procedure, the MS transmits a BR indicator in step 110. Upon receipt of the BR indicator, the BS allocates UL resources for transmission of a BandWidth REQuest (BW-REQ) message to the MS in step 120. In step 130, the MS transmits the BW-REQ message using the allocated UL resources. Upon receipt of the BW-REQ message, the BS allocates UL resources to the MS in step 140 and the MS transmits data via the allocated UL resources in step 150. The MS may also transmit additional UL BR information.

The MS transmits UL request information such as an MS ID, a requested bandwidth, etc. to the BS using a BR indicator in the broadband wireless access system. The MS may also notify the BS of rough information about the Quality of Service (QoS) level of data to be transmitted. Table 1 below illustrates an example of QoS level information to be transmitted in the BR indicator.

TABLE 1

| QoS level | Service Type | Contention-based reservation timeout |
|---|---|---|
| 1 | Real-time | 50 |
| 2 | Real-time | 90 |
| 3 | Real-time | 130 |
| 4 | Non-real-time | 200 |

Because essential UL request information may vary depending on the operation mode of the MS (i.e. non-contention/contention mode), it may be inefficient to transmit UL request information in the same format with no regard to the operation mode.

DISCLOSURE

Technical Problem

An object of the present invention devised to solve the problem lies on a UL requesting method for enabling contention-based MSs and non-contention-based MSs to transmit different UL allocation request information.

Another object of the present invention devised to solve the problem lies on a method for transmitting UL data in an MS to which the above UL requesting method is applied.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings.

Technical Solution

The object of the present invention can be achieved by providing a method for requesting uplink allocation using a BR code index in an MS, including being allocated to a BR code from a BS, and transmitting a BR indicator in a format without an ID of the MS to the BS using the BR code in non-contention mode.

During the BR code allocation, the MS may transmit a DSA-REQ message for a predetermined service to the BS and receive the BR code from the BS through a Dynamic Service Addition-ReSPonse (DSA-RSP) message.

During the BR code allocation, the MS may transmit a BR indicator in a format with the ID of the MS to the BS in contention mode and receive the BR code from the BS through an uplink grant message.

The MS may further determine not to use the BR code, if another BR indicator is not transmitted until a timer for the BR code expires after the transmission of the BR indicator.

The MS may further request release of the BR code through a Dynamic Service Deletion-REQuest (DSD-REQ) message, when the MS determines not to use the BR code.

The MS may further determine not to use the BR code, upon receipt of an invalid BR code through an uplink grant message from the BS.

In another aspect of the present invention, provided herein is a method for replying to an uplink allocation request using a BR code index in a BS, including receiving a BR indicator from an MS, determining that the BR indicator is in a non-contention mode format, upon detection of a BR code allocated to the MS through the BS from the BR indicator, and determining that the BR indicator is in a contention mode format, if the BR code is not detected from the BR indicator.

The BS may further receive a DSA-REQ message for a predetermined service from the MS and transmit the BR code to the MS through a DSA-RSP message.

The BS may further receive a BR indicator in a format with an ID of the MS to the BS in contention mode and transmit the BR code to the MS through an uplink grant message.

The BS may further release the BR code, if the BR code is allocated to the MS and a BR indicator is not received using the BR code from the MS until a timer for the BR code expires.

The BS may further release the BR code, when the BR code is allocated to the MS and a BR code release request is received from the MS through a DSD-REQ message.

The BS may further transmit an invalid BR code through an uplink grant message to the MS, when the BR code is allocated to the MS and the BS determines to release the BR code.

In a further aspect of the present invention, provided herein is a method for transmitting uplink data using a BR code index in an MS, including being allocated to a BR code from a BS, transmitting a BR indicator in a format without an ID of the MS to the BS using the BR code in non-contention mode, and transmitting, upon receipt of an uplink grant message, data to the BS in resources allocated through the uplink grant message.

Advantageous Effects

According to exemplary embodiments of the present invention, MSs performing contention-based BR and MSs performing non-contention-based BR transmit different UL allocation request information. Therefore, unnecessary information transmission is avoided, which is efficient. Also, information specific to each MS can be transmitted in extra resources.

It will be appreciated by persons skilled in the art that that the effects that could be achieved with the present invention are not limited to what has been particularly described hereinabove and the above and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Now, preferred embodiments of the present invention will be described in detail with reference to the accompanying drawings. Those skilled in the art will appreciate that various modifications and variations can be made in the embodiments of the present invention described below. Accordingly, the invention should not be limited to the specific embodiments described herein.

Exemplary embodiments of the present invention provide a method for transmitting different request information according to different Mobile Station (MS) modes (contention mode and non-contention mode) and identifying it by Bandwidth Request (BR) code indices.

Figure 2:
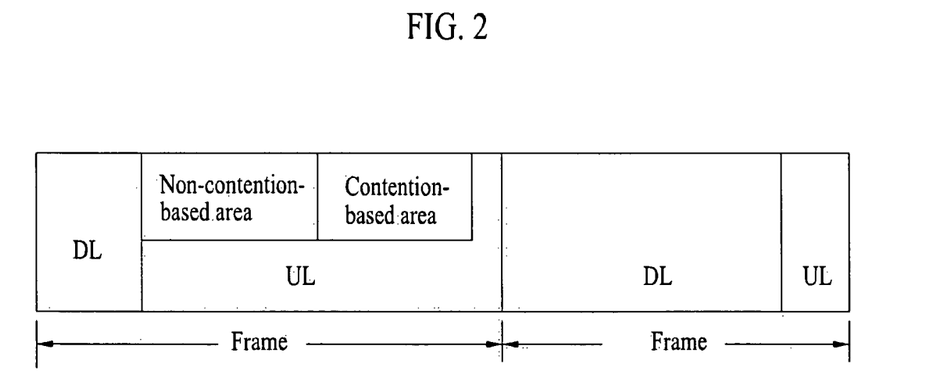
FIG. 2 illustrates an exemplary frame structure in which a non-contention-based MS and a contention-based MS use different areas.

FIG. 2 illustrates an exemplary frame structure in which a non-contention-based MS and a contention-based MS use different areas.

When non-contention-based MSs and contention-based MSs use different areas, the contention-based MSs do not need knowledge of codes allocated to particular MSs. In other words, the contention-based MSs may use all available BR codes in a contention-based area. Information about a non-contention-based area and a contention-based area illustrated in FIG. 2 is transmitted to MSs on a Broadcast CHannel (BCH) or by a SuperFrame Header (SFH).

The MSs that operate in the contention mode randomly select transmission positions and BR code indexes and transmit BR indicators using them. Since the BS cannot identify the MSs that transmitted the BR indicators by the information (i.e. the transmission positions and the BR code indexes), the MSs should transmit their Identifiers (IDs) such as MS-IDs (or Station Identifiers (STIDs)).

Figure 3:
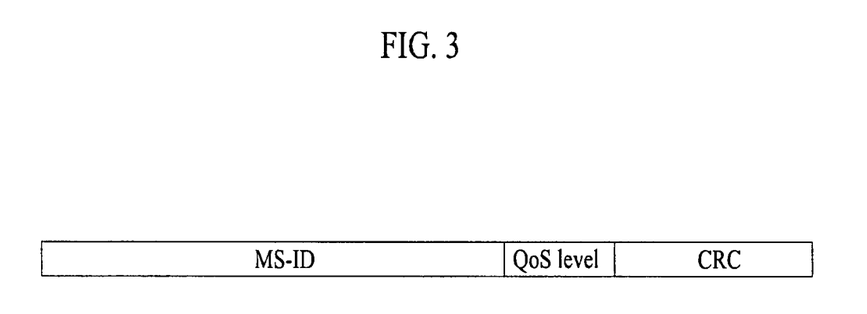
FIGS. 3 and 4 illustrate exemplary UL resource request information transmitted from MSs operating in contention mode.
Figure 4:
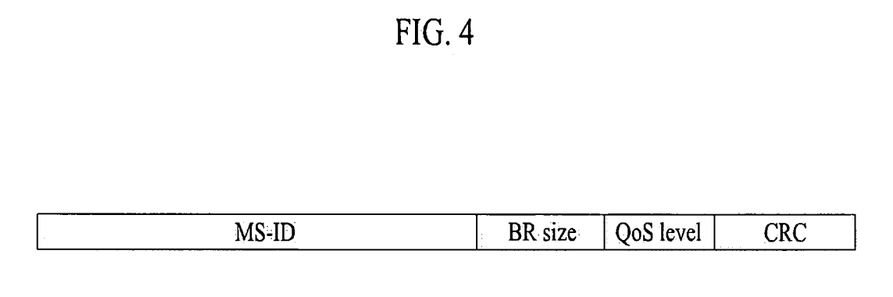

FIGS. 3 and 4 illustrate exemplary UpLink (UL) request information transmitted from MSs operating in the contention mode.

The UL request information illustrated in FIG. 3 does not carry a BR size. Hence, the BS may allocate UL resources of a fixed size. On the other hand, the UL request information illustrated in FIG. 4 carries a BR size along with an MS-ID (or an STID).

MSs that operate in the non-contention mode transmit their BR indicators using BR code indices allocated from the BS (transmission positions may also be allocated from the BS).

Figure 5:
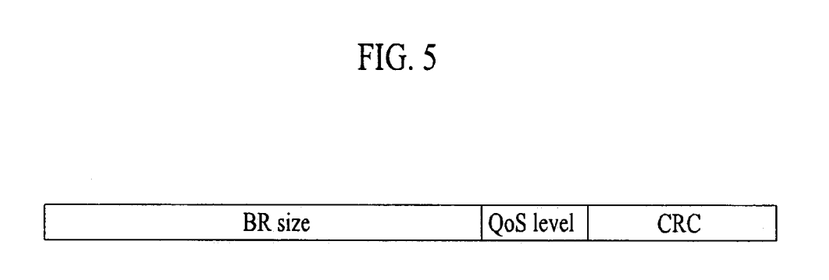
FIG. 5 illustrates exemplary UL resource request information transmitted from MSs operating in non-contention mode.

FIG. 5 illustrates exemplary UL request information transmitted from MSs operating in the non-contention mode.

Because the BS can identify an MS that has transmitted a BR indicator using a BR code index allocated to the MS, the MS does not need to transmit its ID such as an MS-ID or an STID. The MS may use extra resources saved from not transmitting the MS-ID, for transmission of other information.

Figure 6:
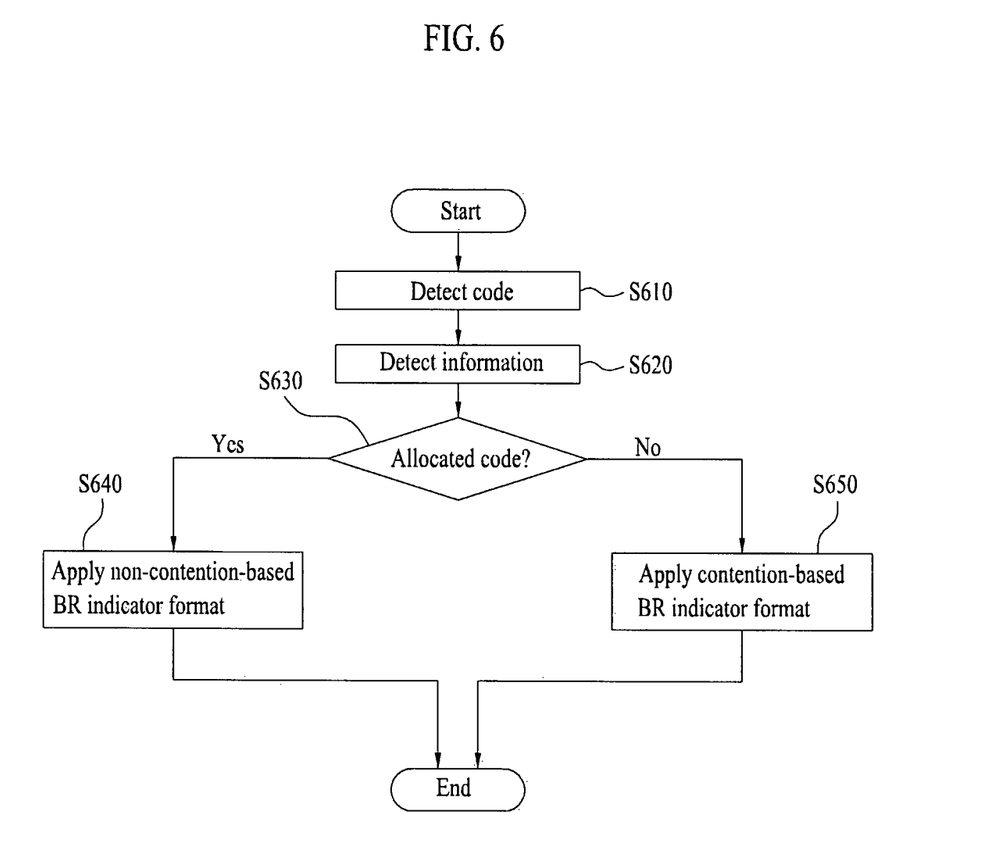
FIG. 6 is a flowchart illustrating an exemplary procedure for distinguishing BR indicators of different formats according to MS operation modes in a BS.

FIG. 6 is a flowchart illustrating an exemplary procedure of distinguishing BR indicators of different formats according to MS operation modes in a BS.

Referring to FIG. 6, the BS decodes a code used for a received BR indicator and information of the BR indicator in steps S610 and S620.

If the code is a BR code allocated to particular MSs in step S630, the BS processes the BR indicator, considering that it is non-contention-based request information in step S640. If the code is not an allocated BR code in step S630, the BS processes the BR indicator, determining it to be contention-based request information as illustrated in FIGS. 3 and 4 in step S650.

The BS may allocate a BR code to an MS having a flow with a grant scheduling type being real-time Polling Service (rtPS) or extended real-time Polling Service (ertPS). Preferably, one BR code may be allocated per MS.

A BR code may be allocated by a Medium Access Control (MAC) message or in a BR procedure using a BR channel. The MAC message may be a Dynamic Service Addition-REQuest/ReSPonse (DSA-REQ/RSP) message, a Dynamic Service Change-REQuest/ReSPonse (DSA-REQ/RSP) message, etc., for example. In spite of a real-time service, the BS may not allocate a BR code to an MS with the real-time service under circumstances.

A BR code may be used to issue a UL request (i.e. a BR indicator) for every real-time flow or specific flows of an MS. Although the MS does not transmit its ID (MS-ID or STID), the BS can identify the MS that has requested a bandwidth.

The BR code may be returned when it is kept unused for a predetermined time or none of flows requiring the BR code exists. Upon request of the MS, the BR code may be returned by a Dynamic Service Deletion-REQuest/ReSPonse (DSD-REQ/RSP) message. Or the BR code may be returned upon request of the BS.

Figure 7:
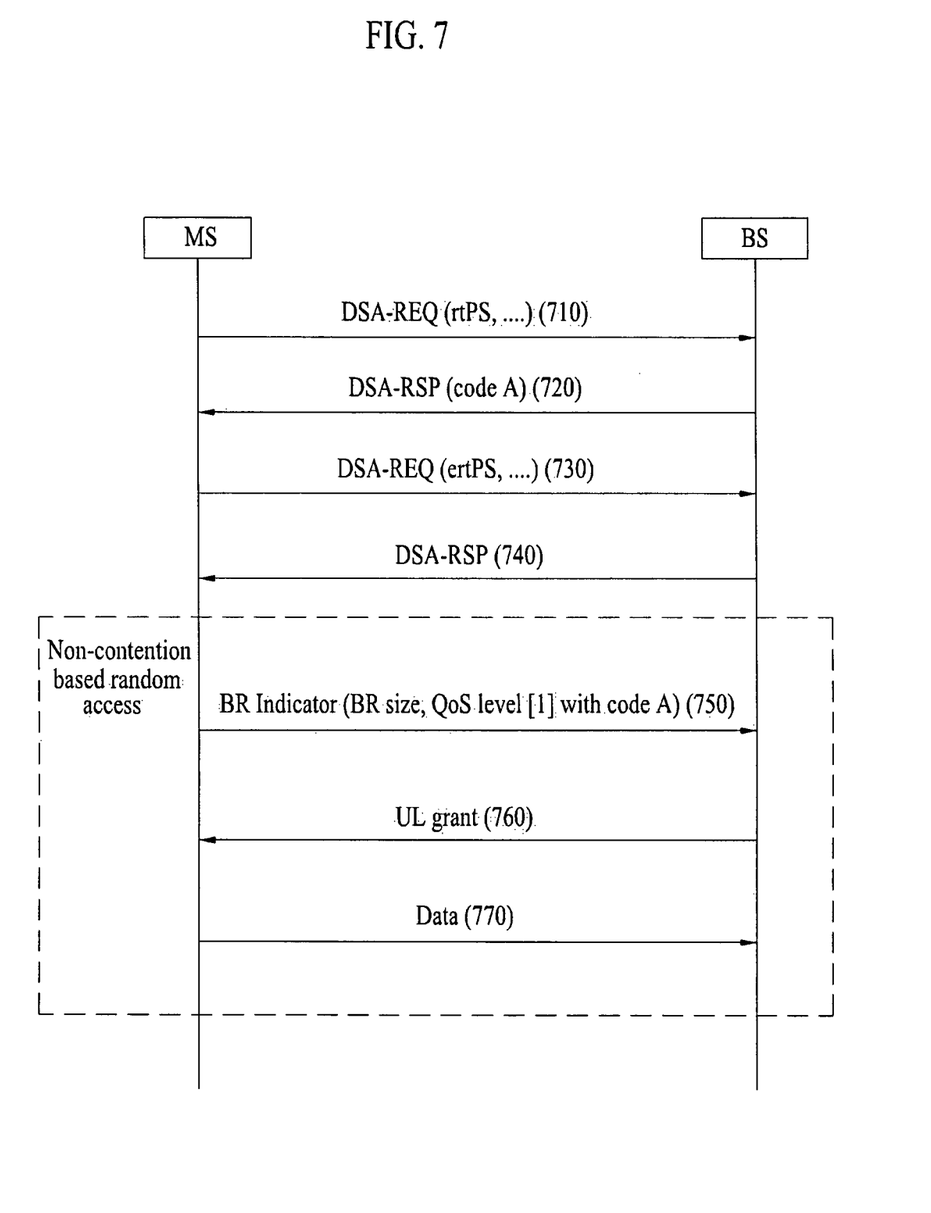
FIG. 7 is a diagram illustrating a signal flow for a procedure of requesting UL resources using a BR code allocated by a Medium Access Control (MAC) message according to an exemplary embodiment of the present invention.

FIG. 7 is a diagram illustrating a signal flow for a procedure of requesting UL resources using a BR code allocated by a MAC message according to an exemplary embodiment of the present invention.

Referring to FIG. 7, the MS transmits a DSA-REQ message to the BS to generate an rtPS flow in step 710.

If a BR code for real-time service has not been allocated to the MS and there are available BR codes, the BS transmits to the MS a DSA-RSP message including information about a BR code (code A) to be allocated to the MS in step 720.

In step 730, the MS transmits a DSA-REQ message to the BS to generate an ertPS flow.

Since the BS has already allocated the BR code, code A to the MS, it transmits a DSA-RSP message without BR code allocation information to the MS in step 740.

When requesting resources in which to transmit real-time service data, the MS transmits a BR indicator using the BR code, code A to the BS in step 750. That is, the MS requests a bandwidth in the non-contention mode.

In this case, since the MS transmits the BR indicator using the BR code allocated by the BS, the BS determines that the MS requests a bandwidth in the non-contention-mode. When the BS allocates resources to the MS in step 760, the MS transmits data via the allocated resources to the BS in step 770.

This method enables the MS to request UL resources in the non-contention mode after the creation of the real-time service flow (i.e. after the transmission/reception of the DSA-REQ/RSP message). Despite this advantage, if the time interval between the flow creation and the actual transmission of a BR indicator is wide, a BR code is unnecessarily allocated to the MS during the time interval.

Figure 8:
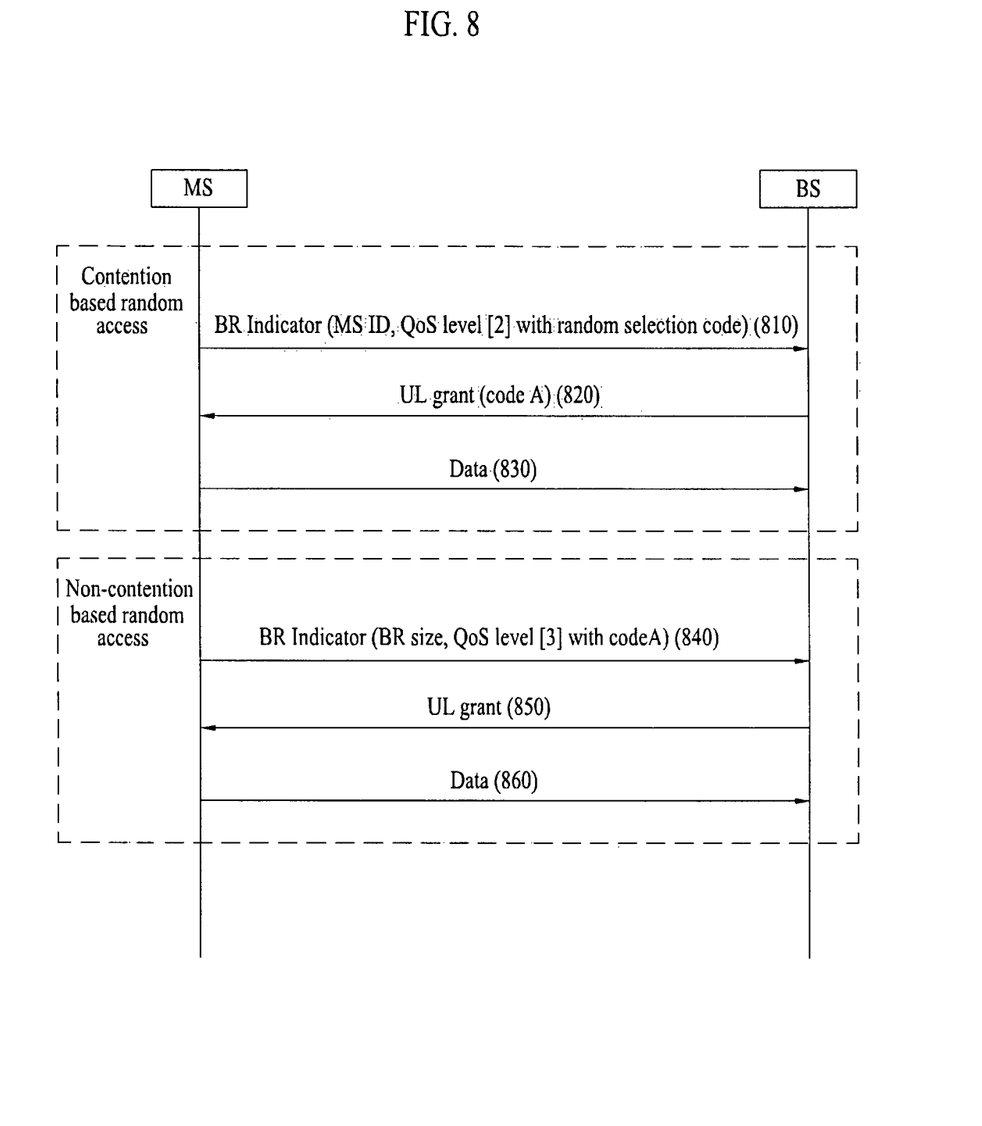
FIG. 8 is a diagram illustrating a signal flow for a procedure of requesting UL resources using a BR code allocated during a BR procedure according to another exemplary embodiment of the present invention.

FIG. 8 is a diagram illustrating a signal flow for a procedure of requesting UL resources using a BR code allocated during a BR procedure according to another exemplary embodiment of the present invention.

Referring to FIG. 8, when the MS requests resources for transmitting real-time service data, it transmits a BR indicator using a randomly selected BR code because the BS has not allocated a BR code to the MS yet in step 810. The BS then determines that the BR indicator is in a contention-based request information format because a BR code allocated by the BS is not used for the BR indicator.

Due to the absence of BR size information in the request information format of FIG. 8, if there are available resources of a fixed size and available BR codes, the BS transmits information about allocated resources along with a BR code to the MS in step 820.

The MS transmits data using the allocated resources in step 830. When requesting real-time service data, the MS transmits a BR indicator using the BR code allocated by the BS in step 840. The BS identifies that the BR indicator is in the non-contention-based request information format and transmits only information about allocated resources to the MS in step 850. In step 860, the MS transmits data in the allocated resources. According to this method, the MS should perform at least one contention-based random access, compared to the method illustrated in FIG. 3.

Figure 9:
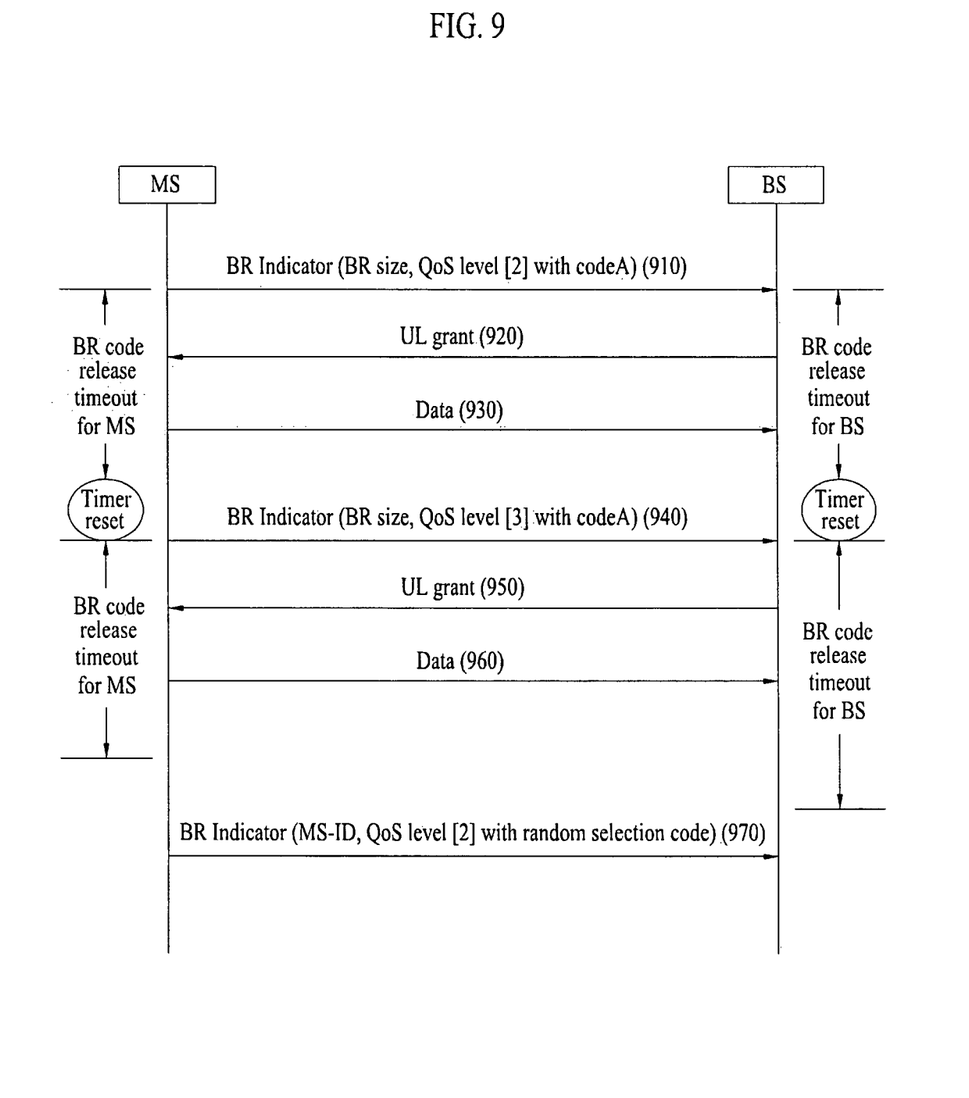
FIG. 9 is a diagram illustrating a signal flow for a procedure of returning (releasing) an allocated BR code using a timer according to an exemplary embodiment of the present invention.

FIG. 9 is a diagram illustrating a signal flow for a procedure of returning (releasing) an allocated BR code using a timer according to an exemplary embodiment of the present invention.

Referring to FIG. 9, the MS transmits a BR indicator using an allocated BR code and transmits data via resources allocated by the BS in steps 910, 920 and 930. When the MS transmits a BR indicator using the same BR code before expiration of a BR code index valid timer in step 940, it resets the timer. Upon receipt of the BR indicator, the BS also resets its timer for the BR code. The MS receives a UL grant in step 950 and transmits data via resources allocated by the UL grant in step 960.

After the expiration of the timer, the MS transmits a BR indicator in a contention-based random access manner in step 970. Preferably, the timeout value of the BS is set to be larger than that of the MS due to a propagation delay, etc.

Figure 10:
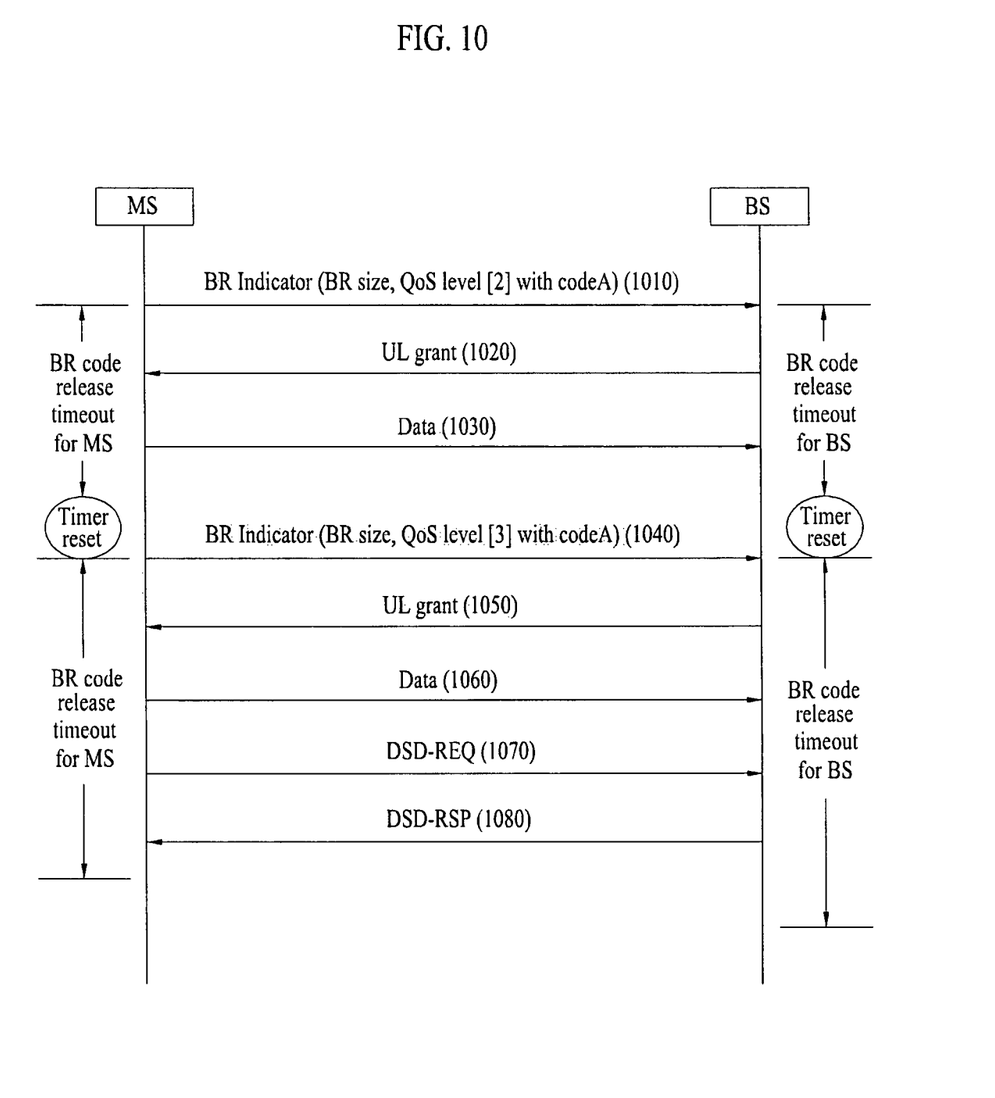
FIG. 10 is a diagram illustrating a signal flow for a procedure of returning (releasing) an allocated BR code using a MAC message (Dynamic Service Deletion-REQuest/ReSPonse (DSD-REQ/RSP)) according to an exemplary embodiment of the present invention.

FIG. 10 is a diagram illustrating a signal flow for a procedure of returning (releasing) an allocated BR code using a MAC message (DSD-REQ/RSP) according to an exemplary embodiment of the present invention.

Referring to FIG. 10, the MS transmits a BR indicator using an allocated BR code and transmits data via resources allocated by the BS in steps 1010, 1020 and 1030. When the MS transmits a BR indicator before expiration of the BR code index valid timer in step 1040, it resets the timer. Upon receipt of the BR indicator, the BS also resets its timer for the BR code. The MS receives a UL grant in step 1050 and transmits data via resources allocated by the UL grant in step 1060.

Before the expiration of the timer, the MS transmits a DSD-REQ message to eliminate the last remaining real-time service flow in step 1070. Upon receipt of the DSD-REQ message, the BS replies with a DSD-RSP message in step 1080. The MS may determine that the BR code has been released immediately after receiving the DSD-RSP message or transmitting the DSD-REQ message. Meanwhile, the BS may release the BR code a predetermined time after transmitting the DSD-RSP message, that is, at a time point which is set, taking into account an expected completed reception time of the DSD-RSP message, not upon the expiration of the timer. Or the BS may release the BR code immediately after transmitting the DSD-RSP message.

If a new flow is generated by modifying some of QoS parameters (e.g. rtPS→BE) using a DSC-REQ message, the new flow may also be processed in the above manner.

Figure 11:
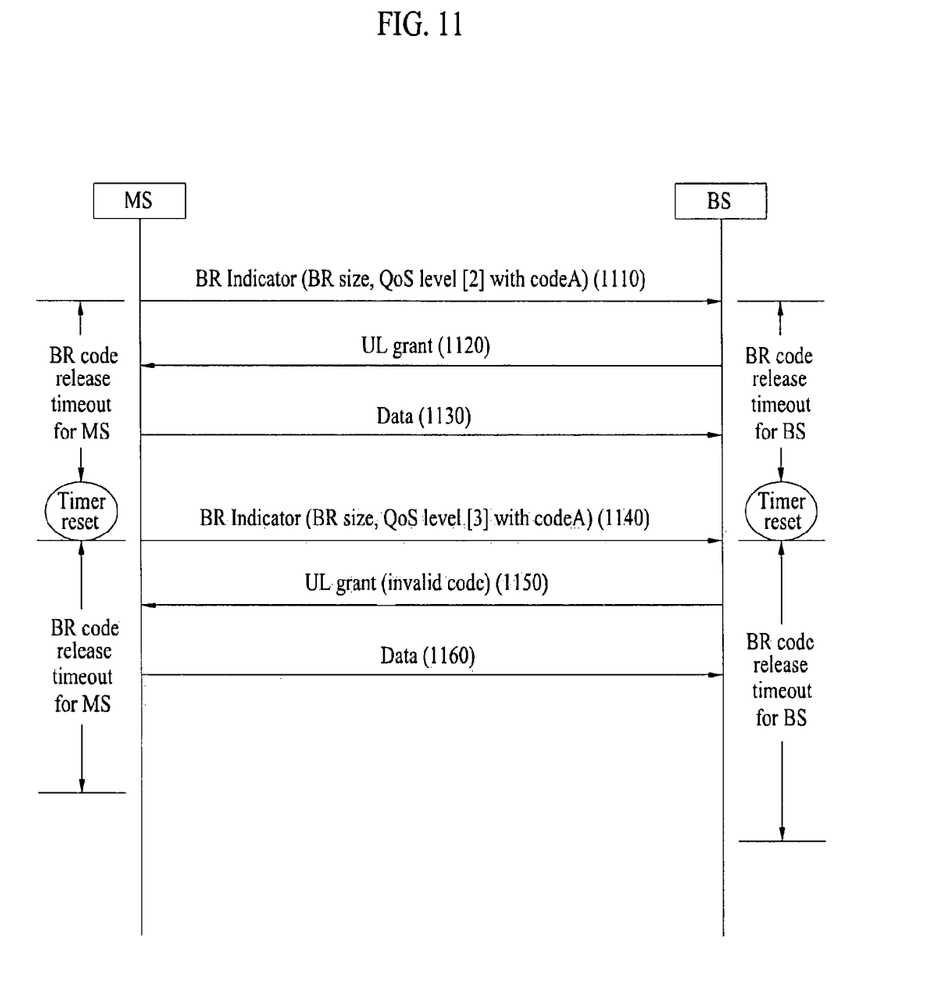
FIG. 11 is a diagram illustrating a signal flow for a procedure of returning (releasing) an allocated BR code, upon request of a BS for BR code release according to an exemplary embodiment of the present invention.

FIG. 11 is a diagram illustrating a signal flow for a procedure of returning (releasing) an allocated BR code, upon request of the BS for BR code release according to an exemplary embodiment of the present invention.

Referring to FIG. 11, the MS transmits a BR indicator using an allocated BR code and transmits data via resources allocated by the BS in steps 1110, 1120 and 1130. When transmitting a BR indicator using the allocated BR code before expiration of the BR code index valid timer in step 1140, it resets the timer. Upon receipt of the BR indicator, the BS also resets its timer for the BR code.

If the MS receives a UL grant from the BS, for transmission of data with QoS level 3 in step 1160 and the UL grant includes an invalid BR code in step 1150, it returns its BR code, determining that the BS wants the MS to return the BR code. The BR code returning may also be defined as determining not to use the BR code in the MS. The request of the BS for returning the BR code may be transmitted by a newly defined MAC message or by a field indicating whether the BR code is released in the UL grant message.

Figure 12:
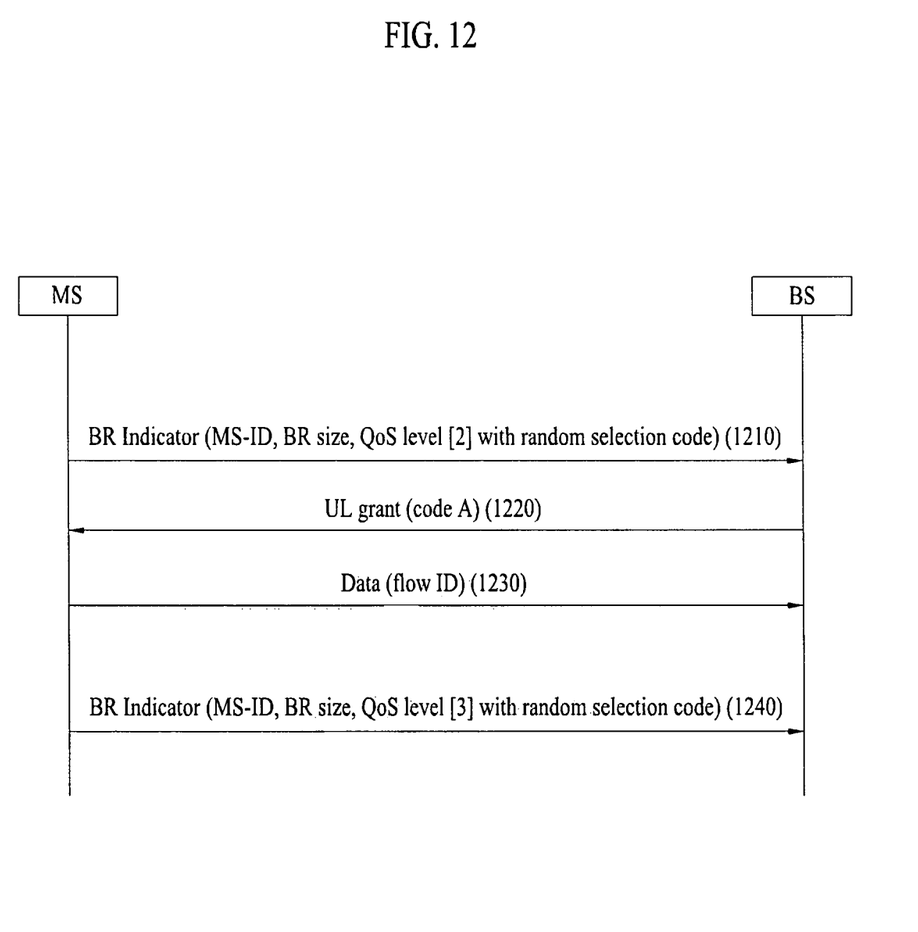
FIG. 12 is a diagram illustrating a signal flow for a procedure of exceptionally processing a BR code in its usage for an MS having an ertPS flow only according to an exemplary embodiment of the present invention.

FIG. 12 is a diagram illustrating a signal flow for a procedure for exceptionally processing a BR code in its usage for an MS having an ertPS flow only according to an exemplary embodiment of the present invention.

The foregoing procedure may be performed in the same manner for an MS having an ertPS flow only. However, considering that a requested bandwidth for the ertPS flow may be always the same, compared to an rtPS flow, it is more efficient to exceptionally process the ertPS flow.

In the exemplary embodiment illustrated in FIG. 7 in which the BS allocates a BR code by a MAC message, the BS does not allocate a BR code for an MS having an ertPS flow only.

Referring to FIG. 12, upon receipt of a BR indicator from an MS with an ertPS flow only in step 1210, the BS determines whether the BR indicator is for an ertPS flow.

In the exemplary embodiment of FIG. 8 in which the BS allocates a BR code in a BR procedure, the BS may allocate a BR code if it cannot determine only from a QoS level whether the BR indicator is for an ertPS flow or an rtPS flow in step 1220.

The MS transmits data via resources allocated by the BS in step 1230.

A flow ID may be included in a data header. If the BS identifies that the BR indicator is for the ertPS flow by the flow ID of the header of data received from the MS, it may release the previously allocated BR code.

Even through the BS allocates a BR code to an MS with an ertPS flow only, the MS may not use the allocated BR code because it knows that a BR indicator to be transmitted is for the ertPS flow in step 1240.

Figure 13:
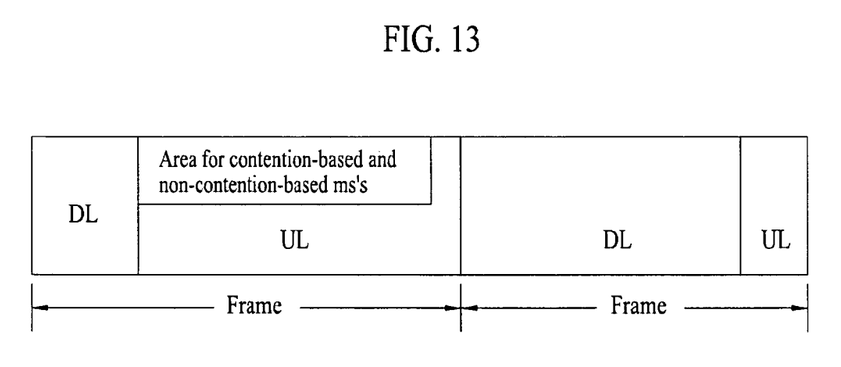
FIG. 13 illustrates a frame structure in which a non-contention-based MS and a contention-based MS share the same area according to an exemplary embodiment of the present invention.

FIG. 13 illustrates a frame structure in which a non-contention-based MS and a contention-based MS share the same area according to an exemplary embodiment of the present invention.

Referring to FIG. 13, contention-based MSs should acquire information about codes allocated to particular MSs because they are not supposed to use already allocated BR codes.

Figure 14:
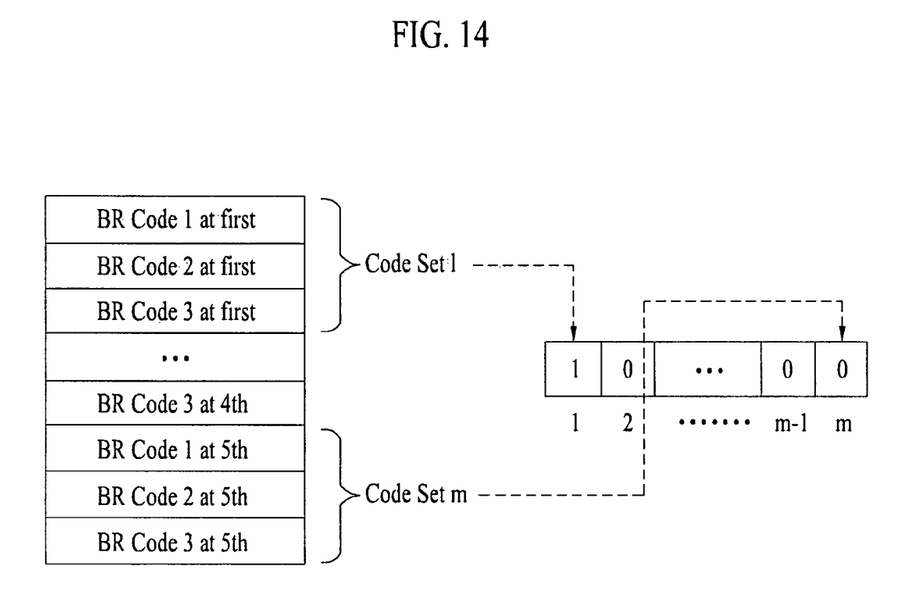
FIG. 14 illustrates a method for notifying an MS of reserved BR codes or available BR codes according to an exemplary embodiment of the present invention.

FIG. 14 illustrates a method for notifying an MS of reserved BR codes or available BR codes according to an exemplary embodiment of the present invention.

Referring to FIG. 14, a reserved BR code set is set to 1 in a bitmap illustrated on the right, and an available BR code set is set to 0 in the bitmap. How the bitmap is set is not limited to FIG. 14. The bitmap illustrated in FIG. 14 may be transmitted to the MS on an arbitrary channel, for example, on a BCH or by an SFH.

Figure 15:
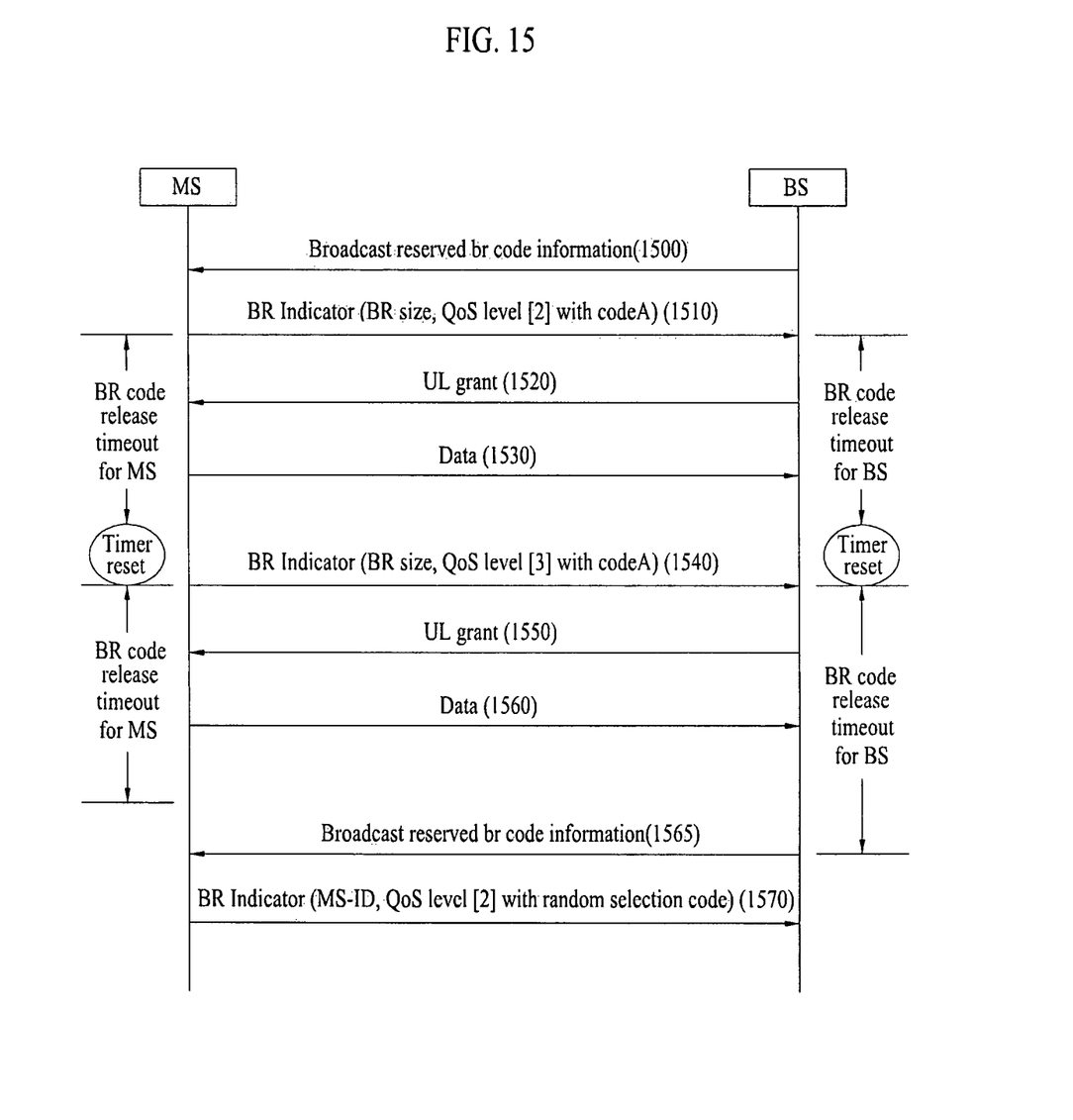
FIG. 15 is a diagram illustrating an exemplary procedure of notifying reserved BR codes in the exemplary embodiment of the present invention illustrated in FIG. 9.

FIG. 15 is a diagram illustrating a signal flow for an exemplary procedure of notifying reserved BR codes in the exemplary embodiment of the present invention illustrated in FIG. 9.

Referring to FIG. 15, the BS broadcasts information about the reserved BR codes in step 1500. An MS may find from the broadcast BR code information that some of BR codes were allocated to other MSs.

In the illustrated case of FIG. 15, since the BR code, code A has already been allocated to the MS, the MS transmits a BR indicator to the BS using the BR code, code A in step 1510. In steps 1520 and 1530, the MS transmits data via resources allocated by the BS. When transmitting a BR indicator before expiration of the BR code index valid timer in step 1540, the MS resets the timer. Upon receipt of the BR indicator, the BS also resets its timer for the BR code. The MS receives a UL grant in step 1550 and transmits data via resources allocated by the UL grant in step 1560.

In step 1565, the BS updates the reserved BR code information simultaneously with the expiration of the timer or a predetermined time after the expiration of the timer and broadcasts the updated reserved BR code information.

After the expiration of the timer, the MS transmits a BR indicator in a contention-based random access manner in step 1570.

MODE FOR INVENTION

Various embodiments have been described in the best mode for carrying out the invention.

INDUSTRIAL APPLICABILITY

The present invention pertains to a UL allocation request in a broadband wireless access system. The exemplary embodiments of the present invention are applicable to a variety of wireless access systems. The wireless access systems may include a $3^{rd}$ Generation Partnership Project (3GPP) system, a 3GPP2 and/or Institute of Electrical and Electronics Engineers (IEEE) 802.xx system, etc. for example. Besides these wireless access systems, the exemplary embodiments of the present invention are applicable to all technical applications of the wireless access systems.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention should not be limited to the description of the embodiment, but defined by the accompanying claims and equivalents thereof.

The invention claimed is:

1. A method for requesting uplink allocation using a Bandwidth Request (BR) code index in a Mobile Station (MS), the method comprising:
   being allocated to a BR code from a Base Station (BS);
   transmitting a BR indicator in a format without an Identifier (ID) of the MS to the BS using the BR code in non-contention mode; and determining not to use the BR code, upon receipt of an invalid BR code through an uplink grant message from the BS.

2. The method according to claim 1, wherein the BR code allocation comprises:
transmitting a Dynamic Service Addition-REQuest (DSA-REQ) message for a predetermined service to the BS; and
receiving the BR code from the BS through a Dynamic Service Addition-ReSPonse (DSA-RSP) message.

3. The method according to claim 1, wherein the BR code allocation comprises:
transmitting a BR indicator in a format with the ID of the MS to the BS in contention mode; and
receiving the BR code from the BS through an uplink grant message.

4. The method according to claim 1, further comprising determining not to use the BR code, if a BR indicator is not transmitted until a timer for the BR code expires after the transmission of the BR indicator.

5. The method according to claim 1, further comprising requesting release of the BR code through a Dynamic Service Deletion-REQuest (DSD-REQ) message, when the MS determines not to use the BR code.

6. A method for replying to an uplink allocation request that uses a Bandwidth Request (BR) code index in a Base Station (BS), the method comprising:
receiving a BR indicator from a Mobile Station (MS);
determining that the BR indicator is in a non-contention mode format, upon detection of a BR code allocated to the MS by the BS from the BR indicator; and
determining that the BR indicator is in a contention mode format, if the BR code is not detected from the BR indicator; and
transmitting an invalid BR code through an uplink grant message to the MS, when the BR code is allocated to the MS and the BS determines to release the BR code.

7. The method according to claim 6, further comprising:
receiving a Dynamic Service Addition-REQuest (DSA-REQ) message for a predetermined service from the MS; and
transmitting the BR code to the MS by a Dynamic Service Addition-ReSPonse (DSA-RSP) message.

8. The method according to claim 6, further comprising:
receiving a BR indicator in a format with an Identifier (ID) of the MS to the BS in contention mode; and
transmitting the BR code to the MS through an uplink grant message.

9. The method according to claim 6, further comprising releasing the BR code, if the BR code is allocated to the MS and a BR indicator is not received using the BR code from the MS until a timer for the BR code expires.

10. The method according to claim 6, further comprising releasing the BR code, when the BR code is allocated to the MS and a BR code release request is received from the MS through a Dynamic Service Deletion-REQuest (DSD-REQ) message.

11. A method for transmitting uplink data using a Bandwidth Request (BR) code index in a Mobile Station (MS), the method comprising:
being allocated to a BR code from a Base Station (BS);
transmitting a BR indicator in a format without an Identifier (ID) of the MS to the BS using the BR code in non-contention mode; and
transmitting, upon receipt of an uplink grant message, data to the BS through resources allocated by the uplink grant message,
wherein, if an invalid BR code is received from the BS through the uplink grant message, the MS determines not to use the BR code.

* * * * *